Feb. 14, 1950      A. D. FIALKOW      2,497,594
STABLE VERTICAL
Filed Dec. 26, 1946
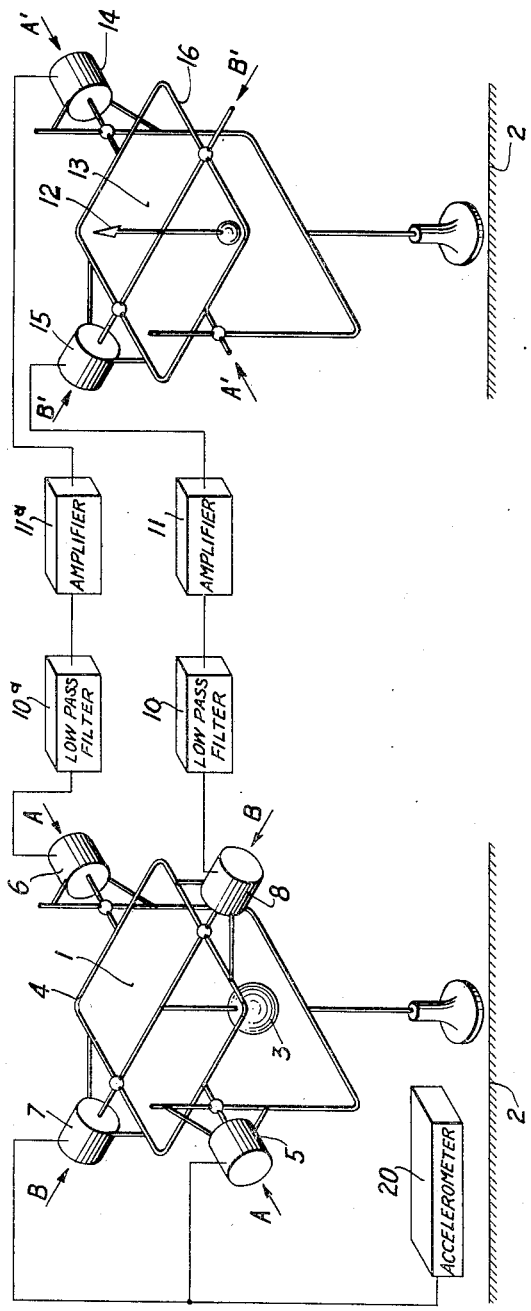
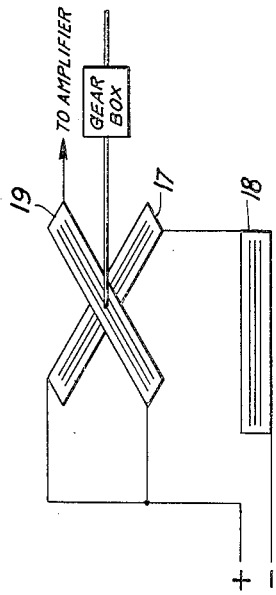
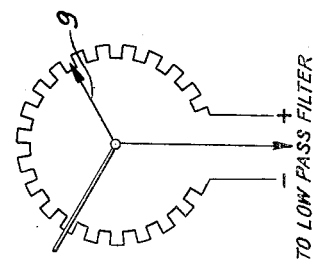
INVENTOR.
*Aaron D. Fialkow,*
BY
*Edward L. Mueller*
ATTORNEY.

Patented Feb. 14, 1950

2,497,594

UNITED STATES PATENT OFFICE 2,497,594

STABLE VERTICAL

Aaron D. Fialkow, New York, N. Y., assignor to Control Instrument Company, Inc., Brooklyn, N. Y., a corporation of New York Application December 26, 1946, Serial No. 718,440

3 Claims. (Cl. 33—220)

This invention relates to improvements in a class of instruments usually referred to as stable verticals, which are generally employed to establish and to maintain a reference axis aboard moving objects which axis is substantially perpendicular to the surface of the earth at or above which it may be at any given instant.

Ordinarily this function was accomplished by a controlled gyroscope, and the art is full of exceedingly complex variations, all of which are intended to control the precessional movements of the gyroscope to maintain it vertical.

The object of this invention is, therefore, to dispense with the gyroscope and its attendant controls and to substitute therefor a simple and direct means for determining the vertical.

It is well known that a pendulum, unless acted on by forces other than gravity, will hang in a true vertical from its support. However, any motion relative to a plane through that point of support, because of the motion of that plane will tend to excite the pendulum into oscillating at a frequency determined mainly by its length, so that its mean position will indicate the vertical and it alone cannot be used.

In accordance with this invention it is therefore proposed to convert the instantaneous position of the pendulum as referred to a plane through its point of support into electrical voltages whose magnitudes are a function of the pendulum position referred to said reference plane, to analyze the voltages for components due to position, oscillation and accelerations other than gravitation and rejecting the components of oscillation and acceleration, to position a follower with the components of voltage indicating position to a true instantaneous vertical.

The above and other objects and the manner of their accomplishment will appear more clearly from the following description when taken in connection with the schematic drawing accompanying this petition, which shows one method of accomplishing the desired end; it being expressly understood that the drawing is merely utilized for describing the invention as a whole and not to define the limits thereof, reference being made to the appended claims for this purpose.

In the drawing:

Fig. 1 is a schematic representation of the system.

Fig. 2 is a schematic representation of the potentiometer arrangement used with the pendulum.

Fig. 3 is a schematic representation of the cross coil ammeter and gear box used to position the indicator.

In the drawing, a gimbal 1 is shown mounted on a "horizontal" portion of the supporting object 2 with its A—A and B—B axes oriented so that they are parallel to the principal axes of the supporting object when the gimbal axes are mutually perpendicular to each other. Within the frame of the gimbal 1 and rigidly suspended from the B—B axis at a point corresponding to the center of gravity of the system, is a pendulum 3 which, because of its mode of mounting, is free to swing in any direction. Each axis is terminated in a lock at one end, i. e., the A—A axis in lock 5 and the B—B axis in the lock 7 and a potentiometer at the other, i. e., the A—A axis in potentiometer 6 and the B—B axis in potentiometer 8. Both locks 5 and 7, unless activated as hereinafter set forth are normally unlatched allowing the shaft forming the B—B axis and the frame 4 pivoted on the A—A axis freedom to rotate and to follow the gyrations of the pendulum 3. Both potentiometers are such as to afford equal increments of resistance for equal angular displacement of their shafts, so that their variable terminals 9 (Fig. 2) referred to either fixed terminal covers the range of resistance as a linear function of shaft displacement and are both connected to a source of constant voltage (not shown).

Any motion, real or apparent, of the pendulum 3 within the gimbal 1 will result in movement of the shaft forming the B—B axis and the frame 4 pivoted on the A—A axis to a degree dependent only on the magnitude of the motion when resolved into components along these axes. This motion will displace the arm 9 of the potentiometer 6 or 8 (or both if the motion has components in both directions) through an angle equal to the angle turned through by the pendulum.

Each component of the pendulum 3 displacement along the A—A axis will be sensed by its rotation of the B—B axis which controls the position of terminal 9 of potentiometer 8; each component of pendulum displacement along the B—B axis will be sensed by its rotation of the frame 4, which controls the position of terminal 9 of potentiometer 6.

For a motion or component of motion about the B—B axis of pendulum 3, the varying output of potentiometer 8 will include a voltage varying as a function of the pendulum instantaneous position $E = f(\varphi)$ and a voltage varying as a function of pendulum oscillation $E_1 = e \sin(\omega t)$.

Now if the pendulum is short so that it has a relatively high natural frequency as compared to the frequency of the pendulum movement due to motion of the object upon which it is mounted, a conventional low pass filter as schematically shown at 10 whose cut off frequency lies below the natural frequency of the pendulum will strip away all components which represent pendulum oscillation $e \sin(\omega t)$ and pass only such as represent motion of the craft as sensed by the pendulum, $E = f(\varphi)$.

This voltage, representative of the object's motion may be amplified in a conventional amplifier 11 whose power output is proportional to its voltage input, whence $P=f(\varphi)$ and used to position an indicator 12 to that component of motion.

This positioning of the indicator 12 is accomplished as follows: A second gimbal 13 is oriented so that its axes are parallel to the axes of gimbal 1 when their respective axes are mutually perpendicular making A—A parallel to A'—A' and B—B parallel to B'—B'.

The extensions of axis B'—B' mounts and is driven by a gear box and cross coil ammeter 15 shown in detail in Fig. 3.

Coils 17 and 18 are excited by a constant current from the same source (not shown) as potentiometers 6 and 8 but coil 19 is excited from the output of the amplifier 18 so that, as the power output varies from 0 to some maximum value $P=f(\varphi)$, the coil position varies linearly over ninety degrees as $\theta=f(P)$. Since $$\theta = \frac{\phi}{4}$$

a 1-4 gear ratio converts thus to 360° of angular displacement and is used to drive the shaft forming the B'—B' axis of gimbal 13, Fig. 1.

In a similar manner, excursions of the pendulum 3 about the A—A axis of gimbal 1 will set the frame 4 in motion and will displace the variable arm 9 of potentiometer 6 as will components of pendulum oscillation about the A—A axis. The voltage thus obtained is filtered in a low pass filter 10a, as aforesaid, to eliminate components of pendulum oscillation, then amplified in amplifier 11a, and used to drive the indicator 12 about the A'—A' axis in the same manner, using a similar device 14 as described for the B'—B' axis.

It follows, therefore, that the indicator will follow only those components of pendulum's motion which are occasioned by its inherent vertical seeking tendency and no other, and will indicate the instantaneous vertical at each and every instant. If the pendulum should be displaced from the vertical by a change in velocity of the object on which it is mounted or by a change in direction of motion, the linear acceleration or centrifugal forces thus set up may be sensed in a conventional and schematically represented accelerometer 20, and their existence caused to actuate the locks 5 and 7. The pendulum motion will then be arrested for the duration of the acceleration and the indicator 12 will indicate the last known vertical until the undesired accelerations no longer affect the pendulum.

What is claimed is:

1. A stable vertical for use on a moving object comprising, in combination, a pendulum of short natural period, means for mounting the same with freedom to rotate about mutually perpendicular axes, means coupled to said pendulum axes yielding varying voltages whose magnitudes are proportional to the displacement of said axes by said pendulum, an indicator, individual means for mounting said indicator with freedom to rotate about mutually perpendicular axes, voltage responsive means coupled to said indicator axes and actuated by the said voltage yielding means to position said indicator in accordance with the position of said pendulum, and an electric filter means interposed between the voltage yielding means and said voltage responsive means to delete from the varying voltages therethrough those voltages arising as a result of the natural oscillation of said pendulum.

2. A stable vertical for use on a moving object comprising, in combination, a pendulum of short natural period, means for mounting the same with freedom to rotate about mutually perpendicular axes, potentiometric means coupled to said pendulum axes capable of yielding varying voltages whose magnitudes are proportional to the displacement of said axes by said pendulum, further means coupled to said pendulum axes to lock the same whenever said pendulum is acted on by accelerative forces other than gravitation, an indicator, separate means for mounting said indicator affording the same freedom to rotate about mutually perpendicular axes, voltage responsive means coupled to said indicator axes and actuated by said voltage yielding means to position said indicator to the mean position of said pendulum, and a low pass electric wave filter interposed between said voltage yielding means and said voltage responsive means for attenuating voltages arising as a result of pendulum oscillation.

3. A stable vertical for use on a moving object comprising, in combination, a pendulum having a short natural period, means for mounting the same with freedom to rotate about mutually perpendicular axes, means coupled to said pendulum axes capable of yielding varying voltages whose magnitudes are proportional to the displacement of said axes by said pendulum, means coupled to said pendulum axes to lock the same when said pendulum is positioned by forces other than gravitation, an indicator, means for mounting the same separately and apart from said pendulum mounting means and affording the same freedom to rotate about mutually perpendicular axes, voltage responsive means coupled to said indicator axes and actuated by said voltage yielding means to position said indicator in accordance with the mean position of said pendulum, and a low pass electric wave filter having a frequency attenuation characteristic which includes the frequency of the natural period of oscillation of said pendulum interposed between said voltage yielding means and said voltage responsive means to delete from the voltage energizing the last named means those voltages arising as a result of pendulum oscillation.

AARON D. FIALKOW.

REFERENCES CITED

The following references are of record in the file of this patent:

UNITED STATES PATENTS

| Number | Name | Date |
|--------|------|------|
| 1,485,783 | Gardner | Mar. 4, 1924 |
| 1,837,609 | Carter | Dec. 22, 1931 |
| 1,924,339 | Weber | Aug. 29, 1933 |
| 2,205,574 | Moross | June 25, 1940 |
| 2,277,027 | West, Jr. | Mar. 24, 1942 |
| 2,317,632 | Miller | Apr. 27, 1943 |
| 2,414,448 | Carter | Jan. 21, 1947 |
| 2,417,765 | Leonard | Mar. 18, 1947 |
| 2,435,195 | Bomberger et al. | Feb. 3, 1948 |

FOREIGN PATENTS

| Number | Country | Date |
|--------|---------|------|
| 680,945 | France | 1930 |

OTHER REFERENCES

Article in Electronics Magazine, November 1944, entitled "Differentiating and Integrating Circuits," pp. 138-142.

Paper entitled "Theory of Servo Systems . . . Stabilization," pp. 353-367, I. E. E. Journal, vol. 93, No. 34, part II, August 1946.